United States Patent
Bahadur et al.

(10) Patent No.: US 8,190,960 B1
(45) Date of Patent: May 29, 2012

(54) GUARANTEED INTER-PROCESS COMMUNICATION

(75) Inventors: Sachin Bahadur, Santa Clara, CA (US); Arun Viswanathan, Cupertino, CA (US)

(73) Assignee: Force10 Networks, Inc., San Jose, CA (US)

( * ) Notice: Subject to any disclaimer, the term of this patent is extended or adjusted under 35 U.S.C. 154(b) by 753 days.

(21) Appl. No.: 12/315,836

(22) Filed: Dec. 5, 2008

Related U.S. Application Data

(60) Provisional application No. 61/007,564, filed on Dec. 13, 2007.

(51) Int. Cl.
G08C 25/02 (2006.01)
H04L 1/18 (2006.01)
H03M 13/00 (2006.01)

(52) U.S. Cl. .................................. 714/751; 714/748

(58) Field of Classification Search .............. 714/748, 714/751
See application file for complete search history.

(56) References Cited

U.S. PATENT DOCUMENTS

| | | | | |
|---|---|---|---|---|
| 6,338,131 B1 * | 1/2002 | Dillon | ............ | 712/201 |
| 6,470,242 B1 * | 10/2002 | Rudow et al. | ............ | 701/1 |
| 7,010,607 B1 * | 3/2006 | Bunton | ............ | 709/228 |
| 7,171,484 B1 * | 1/2007 | Krause et al. | ............ | 709/232 |
| 7,225,327 B1 * | 5/2007 | Rasmussen et al. | ........ | 713/2 |
| 7,535,913 B2 * | 5/2009 | Minami et al. | ............ | 370/401 |

* cited by examiner

*Primary Examiner* — Joseph D Torres
(74) *Attorney, Agent, or Firm* — Haynes and Boone, LLP

(57) ABSTRACT

A multiprocessor system includes multiple processors executing multiple processes that send messages to each other. The system uses a connectionless single-window inter-process communication (IPC) protocol to avoid the high message-processing overhead of a connection-based protocol like TCP. The IPC protocol uses a central message-receive service that runs in the kernel on each processor to handle error-checking and sequence number checking and acknowledge received messages, while the single-window mechanism avoids out-of-order message reordering/buffering complexity. Since each process sending a message does not need to wait for the receiving process (which may be otherwise preoccupied or not even the focus of the receiving processor when the message is received and queued) before receiving acknowledgments, the protocol greatly reduces single-window message latency for all processes without resorting to complex connection-based multi-packet transmission windows.

20 Claims, 7 Drawing Sheets

GUARANTEED INTER-PROCESS COMMUNICATION

CROSS-REFERENCE TO RELATED APPLICATIONS

This application claims priority to co-owned, U.S. Provisional Patent Application Ser. No. 61/007,564, filed Dec. 13, 2007, by Sachin Bahadur and Arun Viswanathan, entitled GUARANTEED INTER-PROCESS COMMUNICATION, which is incorporated herein by reference in its entirety.

BACKGROUND

1. Field of the Invention

The present disclosure relates generally to Inter-Process Communication, and more particularly to systems and methods for efficiently guaranteeing such communications in a connectionless packet architecture.

2. Description of Related Art

In multi-processor systems, applications running on different processors can communicate by way of packets transferred between the processors. Several methods currently exist for implementing Inter-Process Communication (IPC).

One method for implementing IPC is with the Transmission Control Protocol (TCP). TCP is a connection-oriented transport protocol originally described in Postel, J., "Transmission Control Protocol—DARPA Internet Program Protocol Specification", RFC 793, DARPA, September 1981. TCP operates above the Internet Protocol (IP) network layer protocol, providing a tool for computer applications to communicate with other applications across an IP network. When a TCP connection is established between two applications, TCP/IP provides a number of services for the packet communications between the two applications. TCP reorders packets received out of order, automatically retransmits lost packets in a stream, prevents packet duplication, checks for transmission errors, and implements flow control procedures, including a windowing algorithm that limits the amount of data a sender can transmit without all prior transmissions being confirmed first.

To set up a TCP/IP connection, both applications that desire to communicate must bind to a "port" on their local processor, where the port is a sixteen-bit unsigned integer. One of the applications then requests that TCP negotiate a connection with a port on a remote processor, via specification of a "socket" that comprises the IP address associated with the remote processor and the port number associated with the application running on that processor. When a packet arrives at the TCP layer on a processor, the specific TCP connection is identified by the combination of a source socket (the source IP address and source port) and the destination socket (the destination IP address and destination port).

FIG. 1 illustrates an IPC network configuration 100 between two processors that use TCP/IP for delivery of IPC services. The first processor executes three applications A1, A2, and A3 (which could be any application that desires access to a network service), and a kernel K1. The second processor executes three applications A4, A5, and A6, and a kernel K2. The kernel is a portion of the processor's operating system that provides low-level control/access to memory and other processor peripherals, for the benefit of applications and higher-level portions of the operating system. Typically, system calls are provided by which the operating system allows applications to access kernel functionality in a controlled manner.

In FIG. 1, the portion of the kernels K1 and K2 shown implements a Transmission Control Protocol (TCP) portion of a network stack. When a TCP connection is established between a port bound to application A1 and a port bound to application A4, for example, both kernels maintain a state (numbered 1 in FIG. 1) for the connection. The connection state comprises the condition of the local socket, negotiated variables, an acknowledgment sequence number state for sent octets, a resend buffer of packets that have been transmitted but not yet acknowledged by the receiving end, and a receive buffer used to correctly order received packet data. In FIG. 1, each of applications A1-A3 has an established connection with each of applications A4-A6, for a total of nine numbered TCP/IP connections.

A set of transmit and receive port buffers provides an interface between each application and its bound port. Application A1 communicates with a set of port buffers PB1, application A2 communicates with a set of port buffers PB2, etc. When A1 writes packet data to PB1 for delivery to A4, for example, TCP will handle guaranteed delivery of the packet data to PB4. All packet data that was written to PB1 in a certain order will be delivered to PB4 in the same order, albeit possibly intermingled with other packet data from connections 4 and 7. Application A4 merely retrieves the packet data from PB4 and interprets the data in whatever manner A4 expects.

Another method of setting up IPC between two applications is with the User Datagram Protocol (UDP). UDP is described in Postel, J., "User Datagram Protocol", STD 6, RFC 768, August 1980, which is incorporated herein by reference. Like TCP, UDP is a transport layer protocol that runs on top of IP, and provides some error detection. Also like TCP, UDP uses the concept of a socket as a combination of an IP address and a port number. Unlike TCP, however, UDP is connectionless, providing only best-effort delivery of a packet with no acknowledgement of successful delivery or guarantees as to in-sequence delivery, duplicate-free delivery, or delivery at all should a first attempt at delivery of a packet fail. Because of these attributes, IPC over UDP relies on the applications themselves to provide a handshaking mechanism suitable to the situation.

To use UDP, an application binds to a port on its local processor. Any UDP packets received by the processor with that destination port number are buffered for consumption by the bound application. The bound application can also send packets from its socket to a remote socket. Thus two applications can communicate with each other using UDP by merely writing packets to each other's sockets, with no connection establishment phase or UDP state to be consulted.

FIG. 2 illustrates an IPC network configuration 200 between two processors that use UDP/IP for delivery of IPC services. The first processor executes three applications A1, A2, and A3, and a kernel K1. The second processor executes three applications A4, A5, and A6, and a kernel K2. In FIG. 2, the portion of the kernels K1 and K2 shown implements a UDP portion of a network stack. When a UDP packet is received by the processor, the UDP packet is checked for bit errors, and assuming that none exist, the packet is written to the appropriate buffer for the destination socket indicated in the UDP packet. If the packet is received with errors, specifies a port that is not bound to an application, or cannot be forwarded to the appropriate port because the buffer is full, the packet is simply dropped.

In FIG. 2, each of applications A1-A6 implements an acknowledgement (ACK) function. Applications using UDP with an ACK function actually create two UDP sockets for themselves—a request socket, or queue, on which messages (requests) arrive from other processes, and an acknowledgment socket, or queue, on which acknowledgments arrive. Accordingly, when for example application A1 sends a message to application A4, it creates a UDP packet addressed to A4's request socket. When A4 retrieves the application A1 message successfully from its request socket, its ACK function creates an acknowledgment packet addressed to A1's acknowledgment socket. When A1 retrieves and processes the acknowledgment from its acknowledgment socket, it knows that A4 successfully received the message. The applications saves state necessary for these functions, and may also optionally perform reordering and/or retransmission such as those described above for TCP.

BRIEF DESCRIPTION OF THE DRAWINGS

The present invention can be best understood by reading the specification with reference to the following Figures, in which.

DETAILED DESCRIPTION

Figure 1:
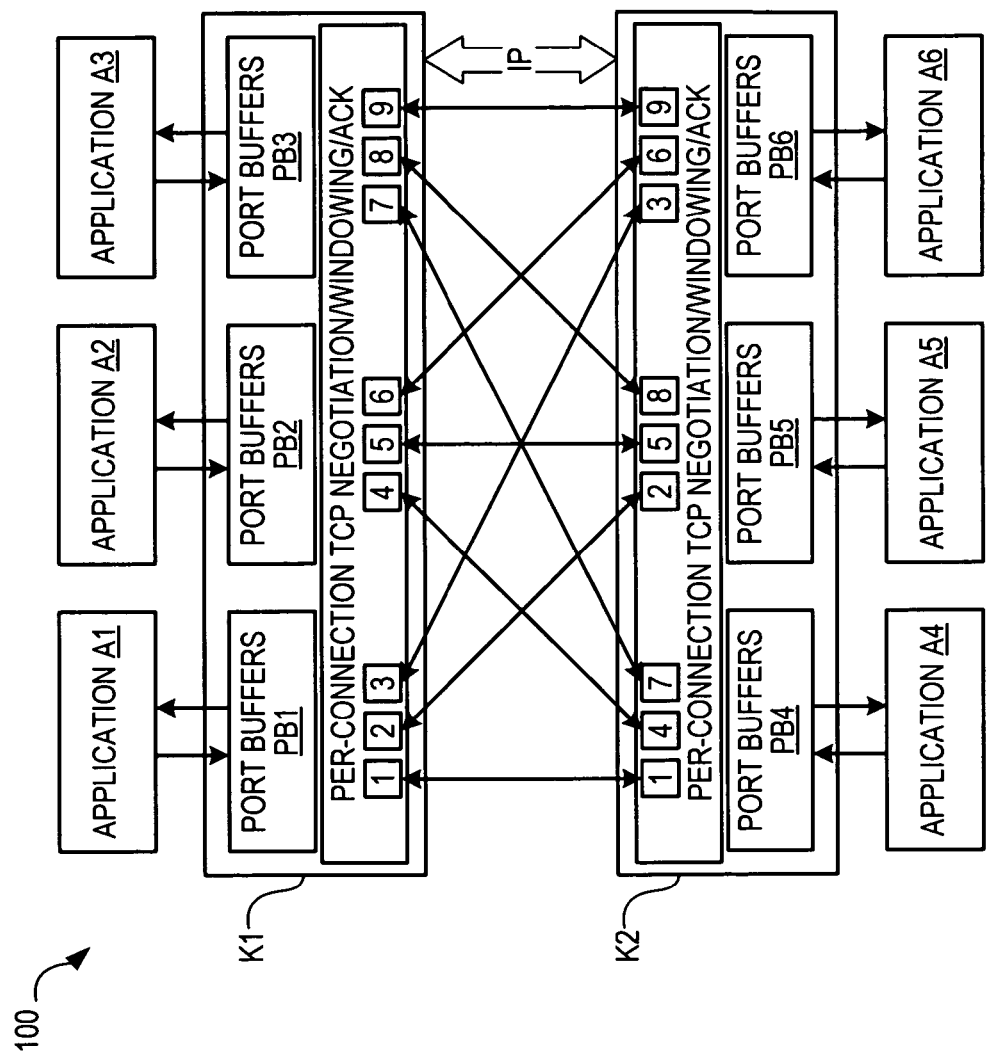
FIG. 1 shows elements of a prior art IPC implementation between applications running on two different processors, the implementation using TCP/IP for delivery of IPC messages.
Figure 2:
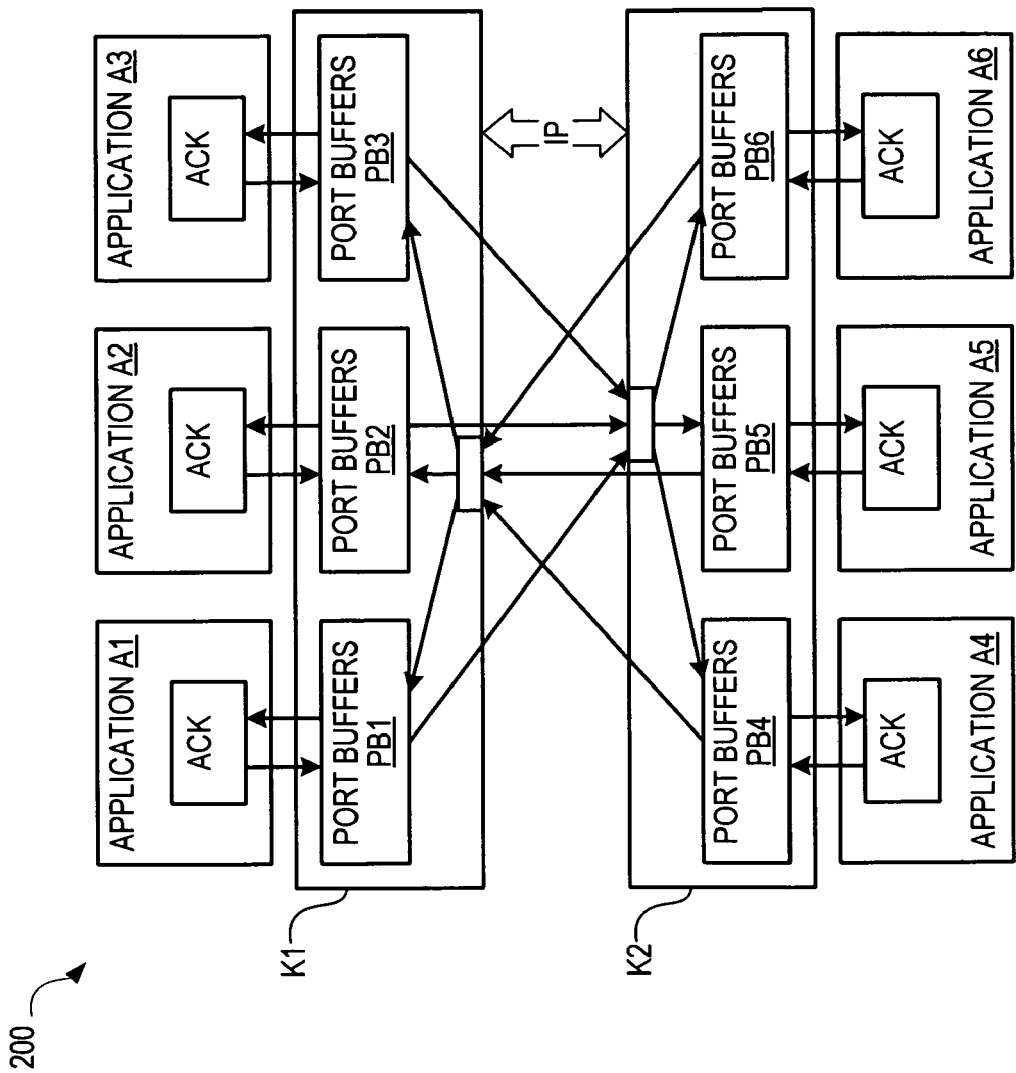
FIG. 2 shows elements of a prior art IPC implementation between applications running on two different processors, the implementation using UDP/IP for delivery of IPC messages.
Figure 3:
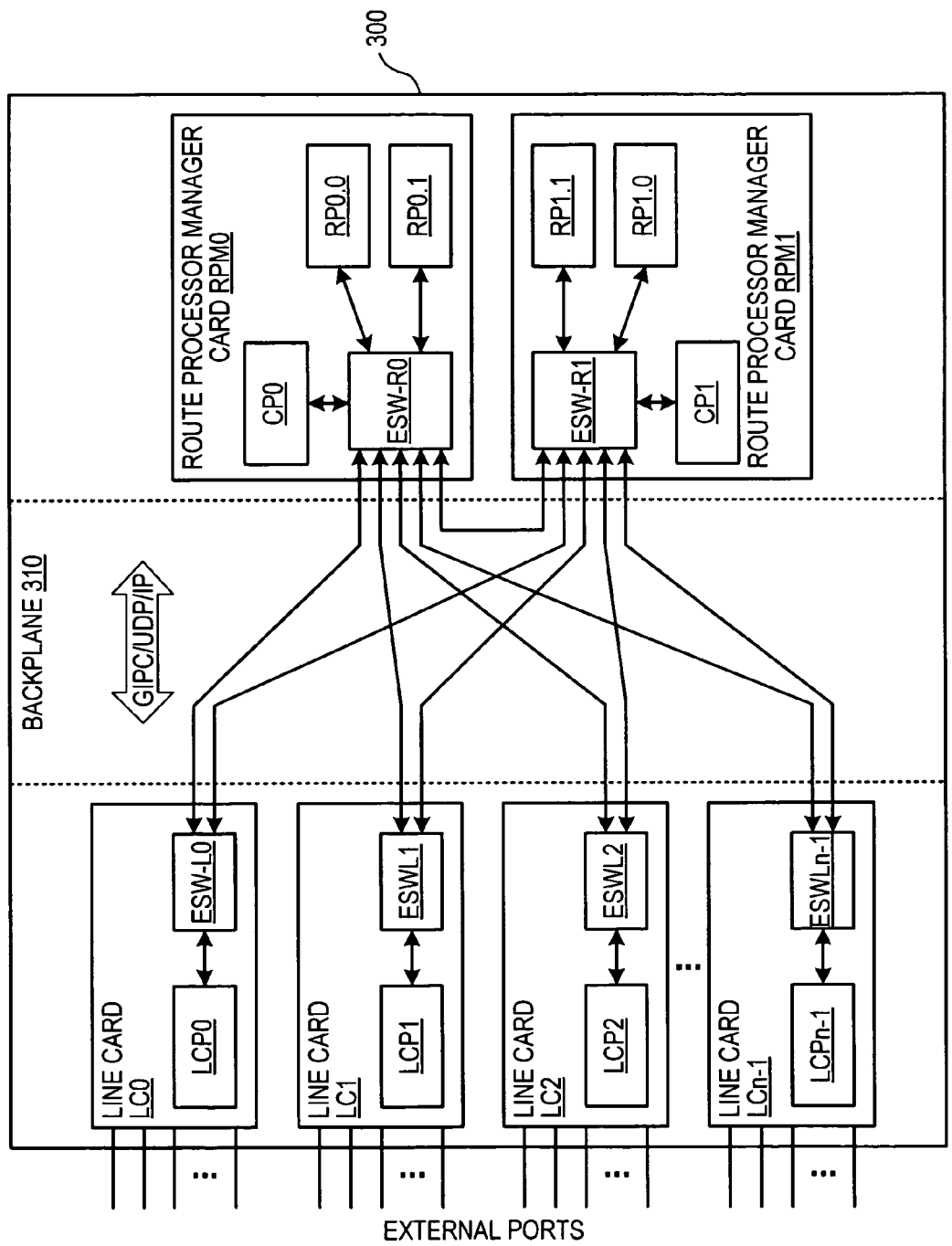
FIG. 3 illustrates a modular network processing device in block diagram form, including a number of processors that communicate via guaranteed IPC (GIPC) according to an embodiment.

It has now been recognized that prior art IPC approaches using TCP and UDP can place unnecessary loads and delays on a distributed processing system in some situations. For example, consider the high-performance packet router/switch illustrated in block diagram form in FIG. 3. Up to n line cards, LC0 to LCn–1, provide external ports for connections to packet endpoints, servers, routers, switches, etc., and process packets that are inbound or outbound on their respective ports. Master and slave route processor manager (RPM) cards, RPM0 and RPM1, manage the switch and the switch-level protocols necessary to support the device functions, and provide the line cards with instructions, configuration, and routing updates necessary for proper operation of the switching and routing functions. A switch fabric, either on the route processor cards or on separate cards (not shown for clarity) allows packet traffic to be switched between the line cards. All of these cards couple to an electrical (or optionally, optical) backplane that provides signal paths for control and data.

The line cards and route processor cards contain processors that control and coordinate operation of the cards, and control and coordinate operation of the switch as a whole in the case of the RPM cards. Each line card LCi contains a processor LCPi that configures that cards ports, routing tables, packet buffers, packet processors, etc. on the card, gathers statistics, and provides local state and routing information to the RPM cards. Each RPM card RPMi contains three processors—a control processor CPi that provides an orderly boot process for the chassis and coordinates and monitors overall configuration and operation of the switch, and two route processors, RPi.0 and RPi.1, that maintain global forwarding tables and operate routing and switching protocols that allow the device to function properly in a network environment.

When operating, each of the RPM card processors typically runs 30 to 40 different processes. Each of these processes typically communicates with companion processes on the other RPM card's processors, as well as with slave processes on each of the line card processors. On a fully populated chassis, switch 300 may have 14 line cards, 20 processors, and 600 to 800 processes, many of which talk to each other. For instance, a single route processor's processes may communicate, collectively, with 500 or more remote processes.

A backplane control communication channel allows the processors to exchange IPC packets. In one embodiment, each line card LCi operates a small Ethernet switch, ESW-Li, and each RPM card operates a larger Ethernet switch, ESW-Ri. The line card Ethernet switches connect their local processors to both of the RPM card switches; the RPM card switches connect their local processors to each other and to all other switches. The backplane provides signal traces that physically connect the Ethernet switches when the cards are resident in the chassis. In an alternate embodiment, the point-to-point switching paths and switches can be replaced with a single backplane "party bus" that operates according to Carrier Sense Multiple Access with Collision Detection (CSMA/CD) principles. Although this alternate embodiment requires less hardware, it provides less bandwidth and also presents a single point of failure that could bring down the whole switch, and is therefore less preferred.

Were this switch operated according to a TCP-based IPC design, each pairing of a process on one processor with another process on another processor would require that a TCP connection be established and maintained between the two. As each TCP connection requires a great deal of processing overhead, maintenance of the TCP connections alone significantly impacts the performance of the processors. It is now believed that for the type of IPC traffic that passes between processors in a system such as the FIG. 3 switch, this processing overhead is unwarranted and undesirable.

Were this device operated according to a prior art UDP-based IPC design, other drawbacks exist. It is not acceptable for the processes to send raw UDP-based data to each other without knowing whether the data was successfully received, as this could result, for example, in some cards operating according to incorrect forwarding tables or some ports not behaving in a way expected by the switch as a whole or by the network. Accordingly, the applications in such a design must implement some sort of acknowledgment process so that the sending application knows that its data was actually received by the destination application. The sending application, however, blocks until it receives the acknowledgment. At the destination application, the incoming UDP packet is placed at the tail of the request socket buffer for that process. The destination application cannot acknowledge receipt until the processor shifts its focus to the application's context, and until the application processes all other packets waiting in the request socket buffer. This results in unpredictable, and possibly lengthy, blocking periods where the sending application can do no useful work. Positive feedback, where a first application blocking while waiting also causes other applications to block that have sent data to the first application, can further exacerbate the situation.

The present embodiments provide a new form of Guaranteed IPC (GIPC) communication for multi-processor networked computing, e.g., across the backplane in a device such as switch 300. The embodiments use a connectionless transport protocol, such as UDP, that allows many sources to communicate with a destination application through a known destination socket. Because the transport protocol is connectionless, the processing overhead and complex state information of a TCP connection are avoided. Unlike traditional UDP-based approaches that rely on two communicating applications to handle acknowledgment, the present embodiments include a small header (the GIPC header), inserted between the application data and the UDP header in an IPC packet. The GIPC header can be processed in the kernel to generate an acknowledgment to the source once the application data has been inserted into the destination socket buffer, without waiting for the application to read and process the data from the buffer. This approach has the potential to greatly reduce source-side blocking time, while providing a level of guaranteed delivery without the disadvantages of connection-based protocols.

Figure 4:
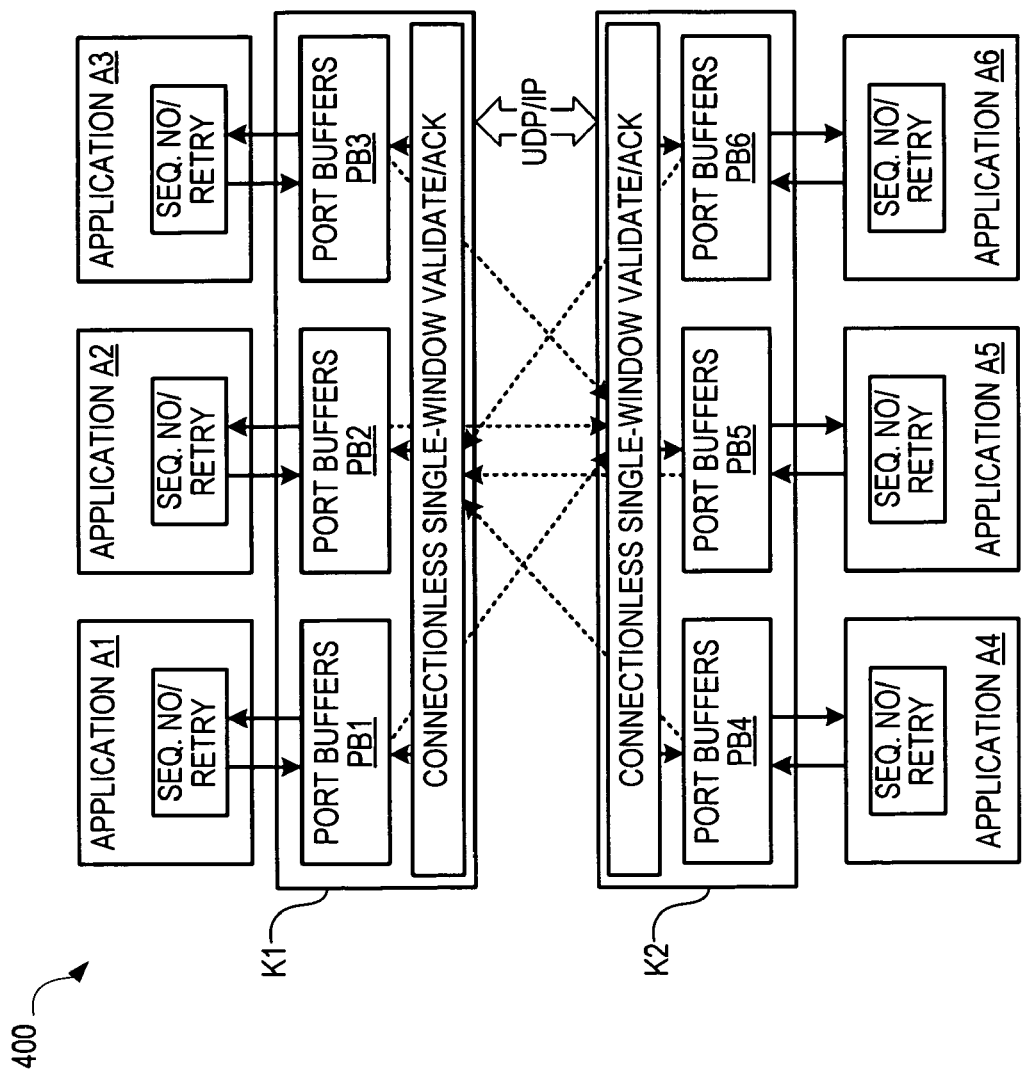
FIG. 4 shows elements of a GIPC implementation between applications running on two different processors, the implementation using UDP/IP and a GIPC receive sublayer according to an embodiment.

FIG. 4 illustrates an IPC network configuration 400 between two processors that use GIPC/UDP/IP for delivery of IPC services. The first processor executes three applications A1, A2, and A3, and a kernel K1. The second processor executes three applications A4, A5, and A6, and a kernel K2. In FIG. 4, the portion of the kernels K1 and K2 shown implements a GIPC receive/acknowledge portion of a network stack, where the GIPC protocol is carried in a small header inserted between the application data and the UDP header. Because the protocol runs in the kernel, it can quickly and efficiently generate ACKs to the sending application's acknowledgment queue when an IPC packet is received. The applications implement the sending portion of the GIPC protocol in this embodiment, e.g., by generating GIPC header field information, waiting for GIPC acknowledgments, and retrying packets if desired when no acknowledgment is received. In this embodiment, GIPC is a single-window protocol—in other words, each application is only allowed to have one unacknowledged GIPC packet pending for a given destination at any one time.

The GIPC header information generated by the sender, and processed by the receiver, includes the following fields. First, a predetermined "magic" number distinguishes the GIPC header from normal application data, allowing UDP to recognize a GIPC packet and direct a received GIPC packet to the GIPC service resident in the kernel. A command type field identifies the GIPC packet as a guaranteed data packet or a guaranteed acknowledgment packet. A sequence number field identifies the data packet and corresponding acknowledgment packet. A message type field is used in acknowledgment packets to indicate whether the sequence number is sequential, or is a "reset" sequence number, as will be explained further below. In an acknowledgment packet, when packet receipt was not successful, a message status field will contain an error code that explains why the data packet delivery was not successful. A message length field describes the length of the payload carried in the GIPC packet. Finally, source and target fields describe the source and destination sockets by IP address and port number.

Figure 5:
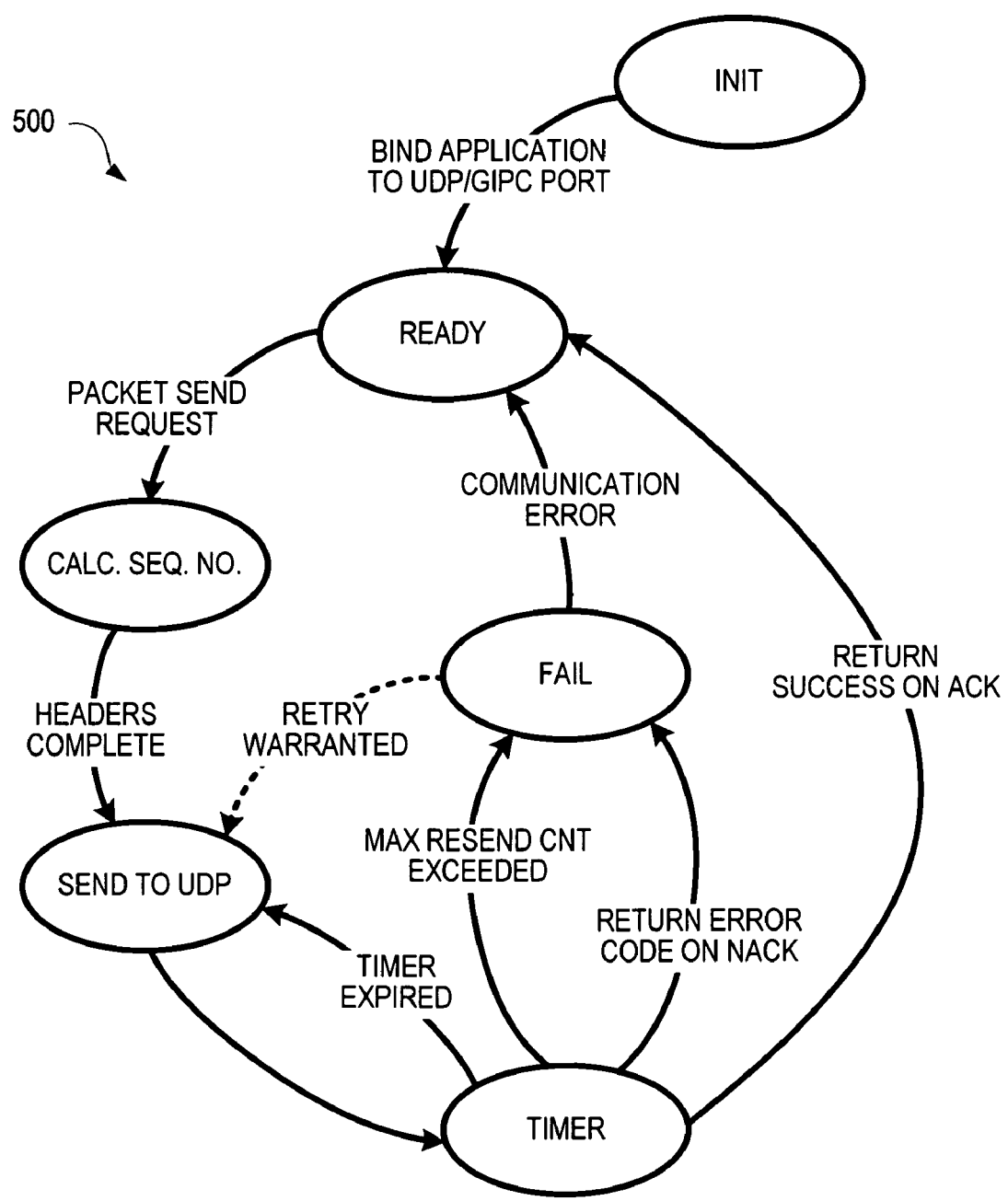
FIG. 5 depicts a state diagram for a GIPC send function according to an embodiment.

FIG. 5 depicts a state diagram 500 for a GIPC sending process in an application. The process transitions from an INIT state to a READY state after the application successfully binds to a UDP/GIPC port pair—one port for messages, and another for acknowledgments.

From the READY state, an application issues a packet send request when it has data to send to a remote application, causing the state to transition to CALC SEQ NO. In this state, the application determines the sequence number and message status to be inserted in the GIPC header. When the application previously has not sent a GIPC packet to the requested destination, a sequence number is generated from a random number. In this case, the message status is set to FIRST to instruct the GIPC receive service to not perform a sequence number check. When the application has previously sent a GIPC packet to the requested destination, the sequence number is incremented from the last GIPC packet sequence number value and the message status is set to NEXT to instruct the GIPC receive service to perform a sequence number check. When the previously sent GIPC packet was never acknowledged, even after multiple retries, the GIPC packet sequence number is still incremented, but the message status is set to FIRST in case the receiver never actually received the packet. Also, when the sequence number rolls over to zero, the FIRST bit is set again, so that the receive process does not perform the sequence number check.

Once the headers are complete, the application transitions to a SEND TO UDP state, which buffers a copy of the GIPC packet and submits the packet to UDP. Once the packet is submitted to UDP, the application transitions to a TIMER state. The first time the application enters the TIMER state for a new packet, a resend counter is initialized to zero, and the timer is initialized based on an average round trip time RTT for the destination, if one has been established, or an average overall round trip time for all destinations. The timer value is preferably set to a multiple of RTT, e.g., 2*RTT. On subsequent entries to the TIMER state for the same packet, the resend counter is incremented, and the timer value is increased, e.g., by a multiplier between 1 and 2.

In the TIMER state, the timer counts down. If the timer expires without an ACK packet being received, the application examines the resend counter. When the resend counter exceeds a maximum retransmit parameter R, the application transitions to a FAIL state. Otherwise, the application transitions back to the SEND TO UDP state, resubmits the packet from the buffered copy, and reenters the TIMER state.

The application also transitions out of the TIMER state when an ACK or NACK (an ACK with a negative acknowledgment) is received on the acknowledgment port for the current sequence number (ACKs with incorrect sequence numbers are dropped and do not cause a state change). In the case of a successful ACK for the current sequence number, the application returns successfully and reenters the READY state, from which another packet can be sent if desired. When the packet is a NACK, the application transitions to a FAIL state. In one embodiment, the FAIL state results in the cause of the failure being logged and the application transitioning to READY but indicating a communication error and unsuccessful transmission. The application can then determine how it would prefer to proceed, which could differ depending on the source, the destination, or even the type of information. For instance, if the information was a periodic update, the application may skip the update, whereas if the information was a response to a query from the destination, the application may issue another packet send request, then or after processing other pending tasks.

In another embodiment, the FAIL state may determine in some circumstances that an additional retry is warranted, and transition to the SEND TO UDP state. For instance, if the destination indicates there was a bit error in the received GIPC data packet, or that the packet was rejected because the socket buffer was full, the application may attempt a retry. If the destination rejects the GIPC data packet for an incorrect sequence number, the application may choose to resend the packet with the message type sent to FIRST if it is evident that the receiver merely missed a packet. Likewise, if the destination rejects the GIPC data packet as a duplicate, but this was the first attempt to send the packet, a retry may be attempted with the FIRST message type. If the destination rejects the GIPC data packet as a duplicate and multiple attempts have been made to send the packet, the application can optionally assume that multiple copies were in fact received and that a first, successful ACK was lost in transit, and actually return success.

Figure 6:
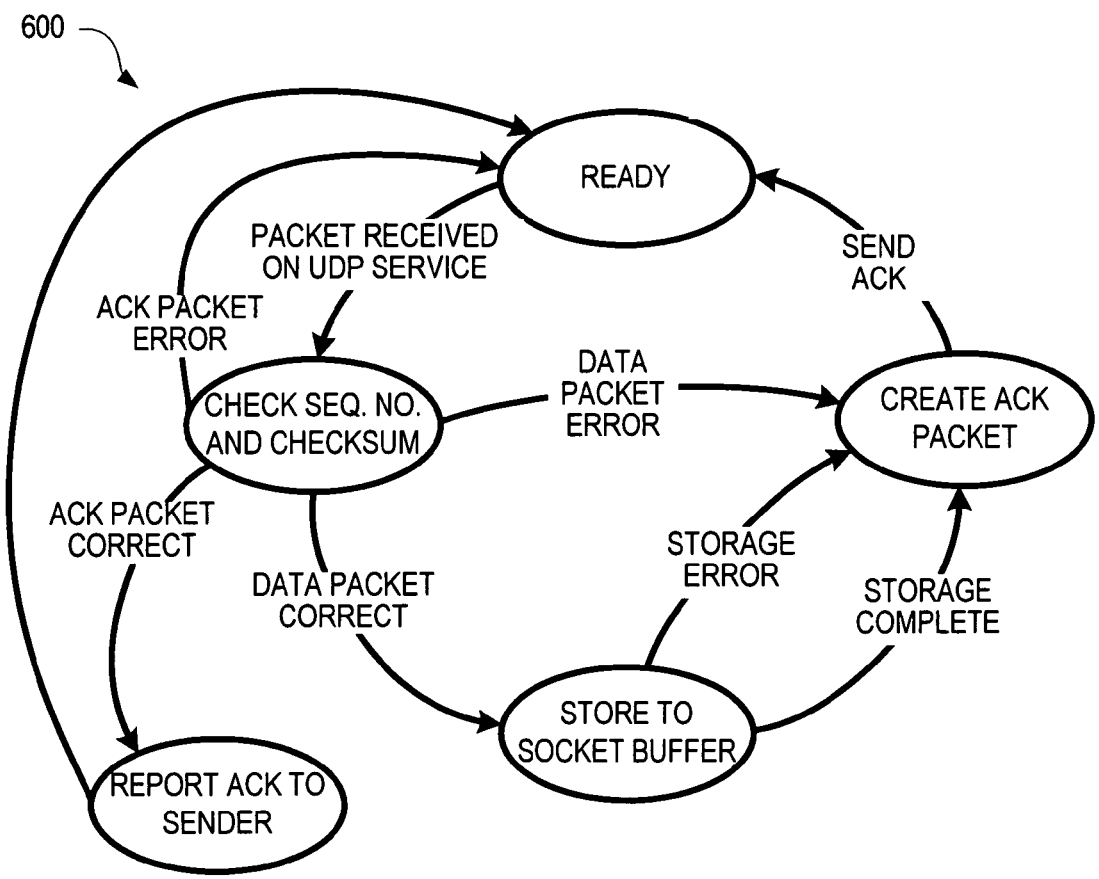
FIG. 6 depicts a state diagram for a GIPC single-window receive function according to an embodiment.

FIG. 6 depicts a state diagram 600 for a GIPC receive service in a kernel. Upon boot up of the kernel and startup of the UDP service, the GIPC state information is reset and GIPC is READY. Subsequently, when the GIPC receive service receives a packet on the UDP service (the two services can be integrated in an embodiment), several checks are performed, including a UDP checksum verification and a GIPC sequence number verification if the packet is a GIPC data packet. When the GIPC packet is an ACK packet that fails the UDP checksum verification, the packet is simply dropped. When the GIPC packet is a data packet that fails the UDP checksum verification, the packet can be dropped, or optionally, if the source is a recognized source, a checksum error can cause a transition to the CREATE ACK PACKET state.

When the GIPC packet is an ACK packet that passes the UDP checksum verification, the service transitions to a REPORT ACK TO SENDER state, which attempts to store the ACK packet to the indicated destination acknowledgment port, and then returns to READY whether the store was successful or not.

When the GIPC packet is a data packet, GIPC sequence number validation is performed. The GIPC receive service stores the last received sequence number for the source socket and destination port. When the data packet header indicates a FIRST sequence number, the sequence number validation replaces the stored sequence number with the received sequence number, and the service transitions to the STORE TO SOCKET BUFFER state. When the data packet header indicates a NEXT sequence number, the stored sequence number is incremented and compared to the received sequence number. When the comparison evaluates false, the service transitions to the CREATE ACK PACKET state and indicates a sequence error (the error can further indicate whether the packet is a duplicate or out-of-sequence packet). When the comparison evaluates true, the service transitions to the STORE TO SOCKET BUFFER state.

In the STORE TO SOCKET BUFFER state, the service removes the GIPC header and attempts to store the data packet to the message socket buffer corresponding to the destination port indicated in the packet. When no application is bound to that port, a storage error is declared and the service transitions to the CREATE ACK PACKET state. Otherwise, the service attempts to store the data packet to the socket buffer. Other errors, such as a lack of socket buffer memory, may also cause a storage error transition to the CREATE ACK PACKET state. When the store operation is successful, however, the service indicates that the store is complete and transitions to the CREATE ACK PACKET state. There is no requirement that the application actually retrieve the packet from the message socket buffer prior to acknowledgment— the ACK indicates to the sender successful delivery to the destination socket buffer. It is assumed that the application will have some other method of determining that its peer is malfunctioning.

In the CREATE ACK PACKET state, the service creates a small GIPC ACK packet, directed to the acknowledgment socket of the original GIPC data packet source, and ACKs the sent sequence number. Optionally, a negative ACK (HACK) is sent upon error, which is like an ACK but includes an error code. The ACK is sent over the UDP service, and the GIPC service returns to a ready state.

Figure 7:
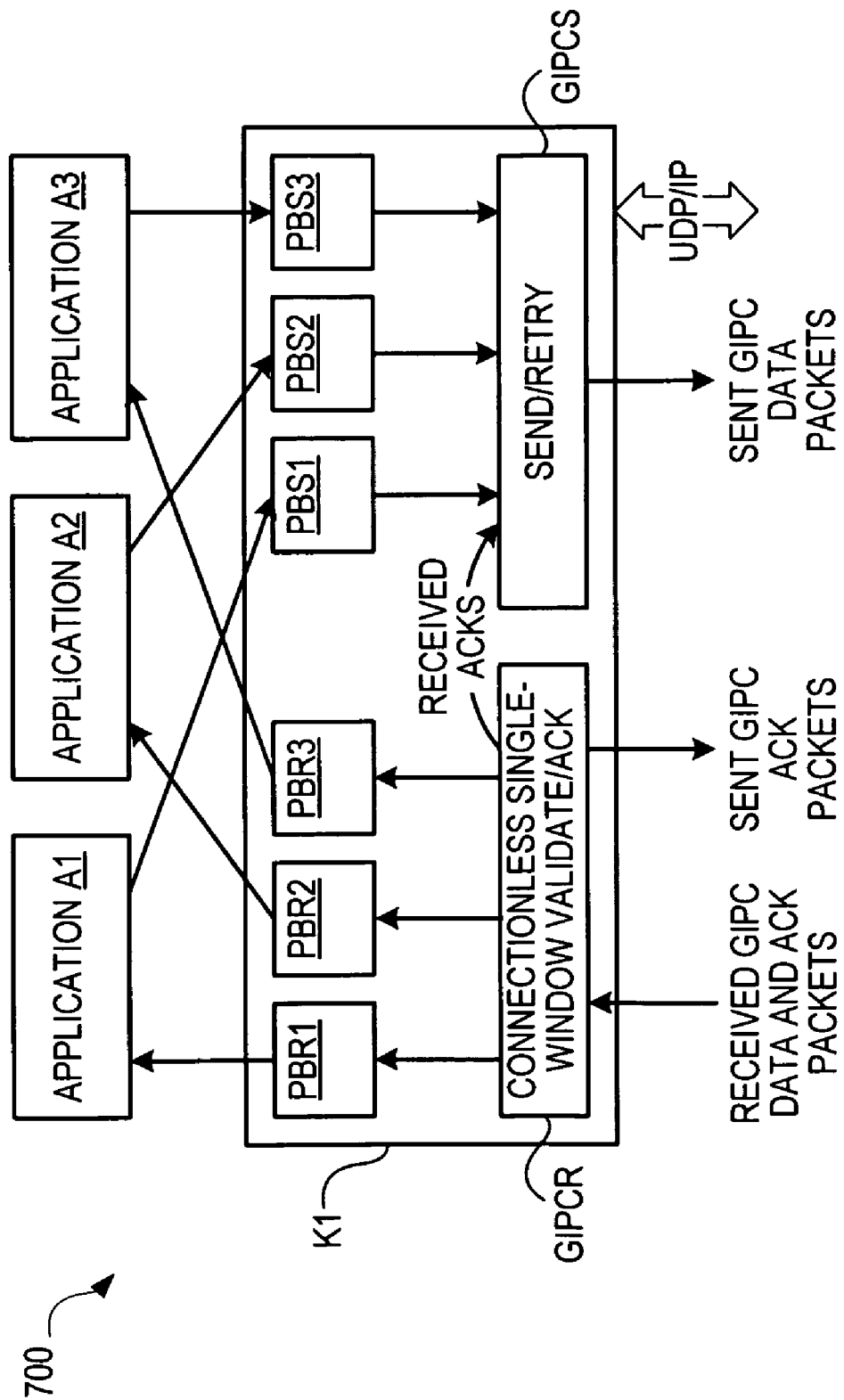
FIG. 7 illustrates an alternate IPC implementation that uses a GIPC receive sublayer and a GIPC send sublayer according to an embodiment.

In an alternate embodiment, the kernel handles GIPC header creation and retries for the send service of GIPC. FIG. 7 depicts GIPC components and applications cooperating in such an embodiment 700. Each of three applications, Ai, binds to a port served by a corresponding port receive buffer, PBRi, and a corresponding port message transmit buffer, PBSi. A kernel K1 includes a GIPCR receive service and a GIPCS send service. The GIPCR receive service operates as previously described in FIG. 6 for received GIPC data and ACK packets, and sends GIPC ACK packets as described. Instead of distributing received GIPC ACK packets to application-based acknowledgment socket buffers, however, those packets are supplied to the GIPCS send service. The GIPCS send service can operate a unique acknowledgment socket for each active application message socket, or can operate a single known GIPC acknowledgment socket to which all GIPCR receive services in the network reply.

The GIPCS send service operates similar to the application-resident service described in conjunction with FIG. 5. Each application is allowed to insert one packet at a time in its send buffer for each destination. Once the packet is accepted, the application need not block, but can perform other tasks and return later to check the status of the requested send. The GIPCS service takes the packets from the socket send buffers, processes them as described, and saves local copies until ACKed or the maximum number of retries is exceeded. When ACKs are received from the GIPCR service, they are matched with the outstanding send timers and processed accordingly. The GIPCS service allows the applications to query a state variable to determine whether a requested send operation is PENDING, COMPLETE, or FAILED.

In one embodiment, the distributed system maintains a global list of applications that use GIPC and the corresponding UDP port numbers. Other processes can consult the global list to determine the appropriate destination socket for a peer application.

Those skilled in the art will appreciate that the embodiments and/or various features of the embodiments can be combined in other ways than those described to implement concepts covered by the present disclosure. The networked processors need not all be in the same chassis. The GIPC protocol can include security features to prevent malicious tampering, should it be implemented in an environment where not all processors on the network are controlled by the same entity and/or trusted. Although NACKs and error codes have been described, a simple embodiment can choose to only transmit successful ACKs back to the sender. No limitation of the broad concepts disclosed herein to a specific approach is suggested or intended by this disclosure.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of operating a first processor, the method comprising:

receiving, at a connectionless message service supporting multiple processes running on the first processor, a first message from a second processor, the first message addressed to a first process running on the first processor, the first message containing header information including a sequence number and error detection coding;

the connectionless message service performing error detection and sequence number checks on the first message, based on the sequence number and error detection coding;

when the first message passes the error detection and sequence number checks on the first message, the connectionless message service attempting to queue the contents of the first message in a first queue assigned to the first process; and when the first message is successfully queued, the connectionless message service creating and sending, to the second processor, a first acknowledgment message indicating the first message was successfully received.

2. The method of claim 1, wherein the connectionless message service utilizes the Uniform Datagram Protocol (UDP) for message transport and the Internet Protocol (IP) for delivery to the second processor.

3. The method of claim 2, the connectionless message service using information existing in a UDP header attached to the first message to perform at least one of the tasks including performing error detection, determining the identity of the first queue, determining the identity of the first process, and creating the first acknowledgment message.

4. The method of claim 2, the connectionless message service using information existing in an IP header attached to the first message to perform at least one of the tasks including performing error detection, determining the location of a saved sequence number to be used for the sequence number check, and creating the first acknowledgment message.

5. The method of claim 1, the connectionless message service interpreting an Inter Process Communication (IPC) header attached to the first message to process the message.

6. The method of claim 5, the connectionless message service removing the IPC header in the first message as queued in the first queue.

7. The method of claim 5, the IPC header containing a checksum field and a sequence number field, the connectionless message service using the checksum field to perform the error detection check and the connectionless message service using the sequence number field to perform the sequence number check.

8. The method of claim 5, the IPC header containing a sequence number field and a sequence number reset flag, the connectionless message service performing the sequence number check by:

when the sequence number reset flag is unset, retrieving a stored sequence number value associated with the first process and the second processor, comparing the stored sequence number value to a value stored in the sequence number field, and failing the sequence number check when the comparison evaluates false or passing the sequence number check when the comparison evaluates true; and when the sequence number reset flag is set, storing the value stored in the sequence number field as the stored sequence number value, and passing the sequence number check.

9. The method of claim 1, further comprising, when the first message is not successfully queued, the connectionless message service creating and sending, to the second processor, a second acknowledgment message indicating the first message was not successfully received, and a code indicating the reason for failure.

10. The method of claim 1, further comprising the connectionless message service distinguishing whether the first message is a data message or an acknowledgment message corresponding to a second message sent to the second processor by the first process, the connectionless message service handling the first message, when the first message is an acknowledgment message, by performing an error detection check and queuing the acknowledgment message in a second queue assigned to the first process for acknowledgments.

11. The method of claim 10, the first process calling a send function of the connectionless message service to send messages to other processors, the send function allowing the first process to have extant at any given time one sent, unacknowledged message to each combination of another processor and port number, the send function attaching a sequence number to each unacknowledged message, the sequence number based on the identity of the other processor and the port number, and any last sequence number used for the other processor and port number, the send function allowing the first process to send another unacknowledged message to a previously used combination of other processor and port number once the prior message sent to the combination has been acknowledged.

12. The method of claim 11, the send function operating a retry timer and resending a previously sent message upon expiry of the timer without receiving an acknowledgment corresponding to that previously sent message.

13. The method of claim 1, wherein the connectionless message service for receiving, checking, queuing, and acknowledging messages runs in a kernel executing on the first processor.

14. The method of claim 13, the connectionless message service allowing processes running on the first processor to register a port and receive a corresponding receive queue assignment, the connectionless message service tracking sequence numbers for each combination of registered port and remote processor sending a message to that registered port.

15. The method of claim 13, the connection message service allowing processes running on the first processor to register an outgoing port and receive a corresponding send queue assignment, the connectionless message service tracking sequence numbers for each combination of registered outgoing port and remote processor and remote port to which a message is sent from that registered port, sending messages from the outgoing port with a sequence number based on the tracked sequence number for the combination of registered port, and remote processor and remote port to which the messages are addressed, and receiving acknowledgments of the packets sent from a registered port.

16. The method of claim 15, the connectionless message service resending messages for which an acknowledgment is not received within a given timer interval.

17. The method of claim 15, the connectionless message service sending a pending message from one of the send queues and addressed to a given combination of remote port and remote processor, when an acknowledgment is received for a previous message sent to that given combination of remote port and remote processor.

18. The method of claim 15, the connection message service allowing each process registering an outgoing port to check the acknowledgment status for messages placed in the send queue assigned to that outgoing port.

19. An apparatus comprising a computer-readable medium containing computer instructions that, when executed by a first processor, causes the first processor to perform a method comprising:

receiving, at a connectionless message service supporting multiple processes running on the first processor, a first message from a second processor, the first message addressed to a first process running on the first processor, the first message containing header information including a sequence number and error detection coding;

the connectionless message service performing error detection and sequence number checks on the first message, based on the sequence number and error detection coding;

when the first message passes the error detection and sequence number checks on the first message, the connectionless message service attempting to queue the contents of the first message in a first queue assigned to the first process; and when the first message is successfully queued, the connectionless message service creating and sending, to the second processor, a first acknowledgment message indicating the first message was successfully received.

20. The apparatus of claim 19, the computer instructions for receiving, checking, queuing, and acknowledging messages running in a kernel executing on the first processor.

* * * * *